D. F. SEXTON.
Sheep Rack.
No. 55,370. Patented June 5, 1866.
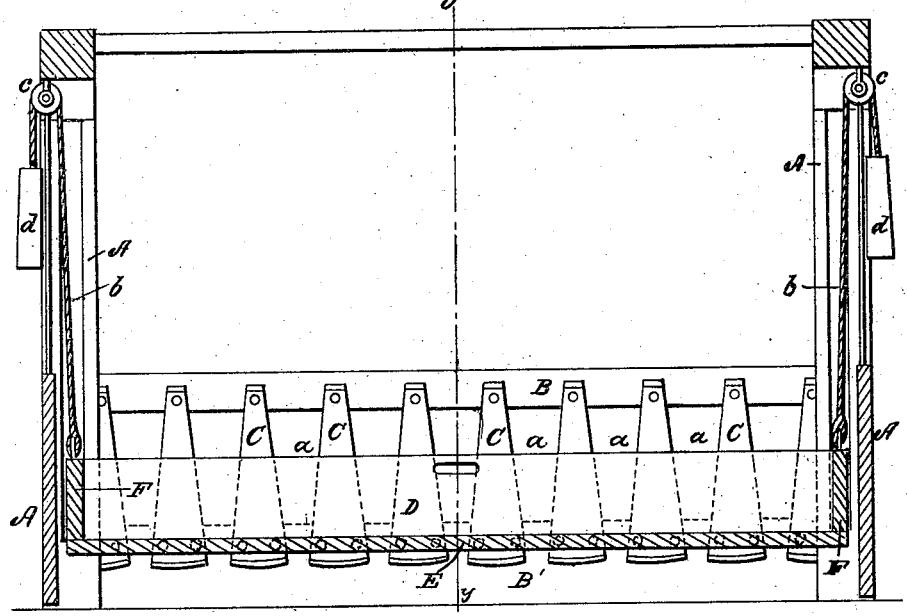
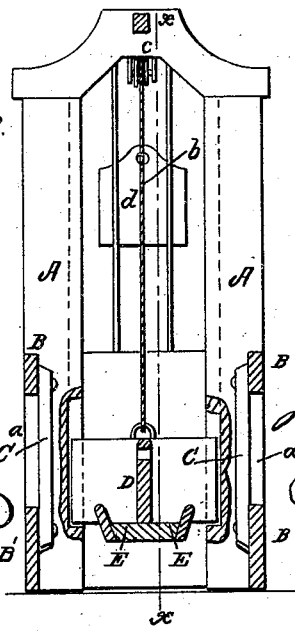

United States Patent Office.

D. F. SEXTON, OF WHITING, VERMONT.

IMPROVEMENT IN SHEEP-RACKS.

Specification forming part of Letters Patent No. 55,370, dated June 5, 1866.

*To all whom it may concern:*

Be it known that I, D. F. SEXTON, of Whiting, in the county of Addison and State of Vermont, have invented a new and Improved Sheep-Rack; and I do hereby declare that the following is full, clear, and exact description thereof, which will enable others skilled in the art to make and use the same, reference being had to the accompanying drawings, forming part of this specification, in which—

Figure 1 is a longitudinal vertical section of my invention, taken in the plane of the line *x x*, Fig. 2. Fig. 2 is a vertical cross-section taken in the plane of the line *y y*, Fig. 1.

Similar letters of reference indicate corresponding parts.

My invention consists in arranging the troughs of a sheep-rack within a suitable frame in such manner that they can be run up or down in the frame-work, and thus be raised when it is desired to fill them with feed and then run down, the sheep being the meanwhile prevented from annoying the operator; also, in so placing strips for dividing off the spaces of access to the troughs for each sheep, that the opening through which the animal's head may be thrust shall be greater at the top than at the bottom, whereby the sheep are not so likely to waste the feed, inasmuch as they are obliged to raise their heads before they can withdraw them from the opening, and therefore the particles of food drop into the trough, whereas, where the openings are of the same size throughout, the sheep draw their heads out in a way which causes the particles of food to drop upon the ground and be wasted.

A A designate the uprights which constitute the ends of the frame.

B B' are cross-pieces extending longitudinally from one end of the frame A to the other. To the longitudinal pieces B and B' are secured the partition-strips C. These are tapering in form, and so secured that there will be a greater space at the top than at the bottom, as shown clearly in Fig. 1.

These strips, as before stated, are thus arranged, so as to compel the sheep to raise their heads before they can withdraw them from the space *a*, and thus the food they may not have properly taken in their mouths will drop back into the troughs instead of being wasted, which latter would be the case were the space of equal size throughout.

D is a partition-board, on each side of which the troughs E E are arranged.

F is an end piece connecting the troughs, and this is arranged to slide in grooves formed in or by the uprights of the device, and thus the troughs and partition-plates are guided.

These troughs, it will be seen, are arranged so as to be capable of being slid up and down in guides in the end pieces, A. A cord, *b*, passing over sheaves *c* at the top of the uprights, and has weights *d* on the ends, which serve as a ready means for raising the troughs.

Fig. 2 shows an end elevation of the trough when raised, and, in section, the trough, when lowered in a position for permitting the sheep to eat.

By arranging the troughs so that they can be raised or lowered the tender of the sheep is enabled to fill the troughs when elevated above the reach of the sheep, and thus considerable annoyance, caused by the sheep crowding up for the food, is obviated. Again, the troughs can be brought to a position where they can very readily be cleaned.

This sheep-rack not only serves as a means for feeding grain, &c., to sheep, but as a hay-rack also; but this latter feature I do not claim.

What I claim as new, and desire to secure by Letters Patent, is—

1. Arranging the troughs in a sheep-rack so that the same can be slid up and down in suitable guides, substantially as and for the purpose specified.

2. So arranging the division-strips C that a greater space shall be provided at the top than at the bottom, substantially as and for the purpose specified.

The above specification of my invention signed by me this 15th day of March, 1866.

D. F. SEXTON.

Witnesses:
  WHITFIELD WALKER,
  ELLEN C. WALKER.